(12) United States Patent
Koch

(10) Patent No.: US 9,183,424 B2
(45) Date of Patent: Nov. 10, 2015

(54) ANTENNA ARRAY WITH ASYMMETRIC ELEMENTS

(71) Applicant: SYMBOL TECHNOLOGIES, INC., Schaumburg, IL (US)

(72) Inventor: Michael J. Koch, Fort Salonga, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/072,332

(22) Filed: Nov. 5, 2013

(65) Prior Publication Data

US 2015/0122886 A1    May 7, 2015

(51) Int. Cl.
| | | |
|---|---|---|
| G06K 7/04 | (2006.01) | |
| G06K 7/10 | (2006.01) | |
| H01Q 21/00 | (2006.01) | |
| H01Q 21/08 | (2006.01) | |
| H01Q 21/20 | (2006.01) | |

(52) U.S. Cl.
CPC ........ *G06K 7/10356* (2013.01); *H01Q 21/0006* (2013.01); *H01Q 21/08* (2013.01); *H01Q 21/205* (2013.01)

(58) Field of Classification Search
USPC ............ 235/444, 495, 451; 343/700 MS, 893
See application file for complete search history.

(56) References Cited

U.S. PATENT DOCUMENTS

| | | | |
|---|---|---|---|
| 4,162,499 A | 7/1979 | Jones, Jr. et al. | |
| 4,958,162 A | 9/1990 | Roberts et al. | |
| 4,980,692 A | 12/1990 | Rudish et al. | |
| 5,434,581 A | 7/1995 | Raguenet et al. | |
| 5,955,994 A * | 9/1999 | Staker et al. | ........... 343/700 MS |
| 6,608,595 B1 | 8/2003 | Louzir | |
| 7,460,072 B1 | 12/2008 | Goldberger | |
| 2007/0164868 A1* | 7/2007 | Deavours et al. | ........... 340/572.7 |
| 2009/0058731 A1* | 3/2009 | Geary et al. | ........... 343/700 MS |

(Continued)

FOREIGN PATENT DOCUMENTS

| | | |
|---|---|---|
| CN | 103457017 A | 12/2013 |
| EP | 0492010 B1 | 11/1995 |

(Continued)

OTHER PUBLICATIONS

UK Combined Search and Examination Report mailed May 5, 2015 in counterpart UK application GB1419523.4.

*Primary Examiner* — Ahshik Kim
(74) *Attorney, Agent, or Firm* — Nong-Qiang Fan

(57) ABSTRACT

An RFID reader is provided that includes an antenna array comprising multiple antenna elements circumferentially distributed around a longitudinal axis of the antenna array. Each antenna element includes multiple patch elements disposed above one or more underlying substrates, wherein the patch elements of each antenna element are disposed on an outer side of the antenna element. Further, one or more of the antenna elements is an asymmetric antenna element, wherein a first end of the asymmetric antenna element is wider than a second, opposite end of the asymmetric antenna element, wherein a first patch element disposed proximate to the first end of the asymmetric antenna element is larger than a second patch element disposed proximate to the second end of the asymmetric antenna element, and wherein a resonant frequency associated with the first patch element is approximately the same as a resonant frequency associated with the second patch element.

21 Claims, 5 Drawing Sheets

(56) References Cited

U.S. PATENT DOCUMENTS

2009/0231225 A1* 9/2009 Choudhury et al. .......... 343/770
2011/0285601 A1   11/2011 Shih et al.

FOREIGN PATENT DOCUMENTS

EP    1135832 B1   12/2005
GB    2248344 A    4/1992

* cited by examiner

ANTENNA ARRAY WITH ASYMMETRIC ELEMENTS

FIELD OF THE INVENTION

The present invention relates to wireless communication systems and, more particularly, to a circular antenna array used in a wireless communication system.

BACKGROUND OF THE INVENTION

Radio Frequency (RF) coverage is an important consideration in the deployment of Radio Frequency Identification (RFID) systems. One factor that impairs RF coverage are the nulls that result from destructive interference caused by multipath fading. On the other hand, multipath propagation can also result in constructive interference, which can improve RF coverage and the range of an RFID reader.

RFID readers that employ beam steering techniques using phase array antennas typically have better RF coverage than RFID readers that use traditional antennas due to the phase array antennas' ability to steer a beam and thereby mitigate fading due to multipath. Correspondingly, the better the directivity of an antenna, the better the ability of the antenna to mitigate fading. However, a large antenna is required in order to achieve high directivity, which may pose mounting problems and may be undesirable for an RFID reader, where the smaller the reader the better.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
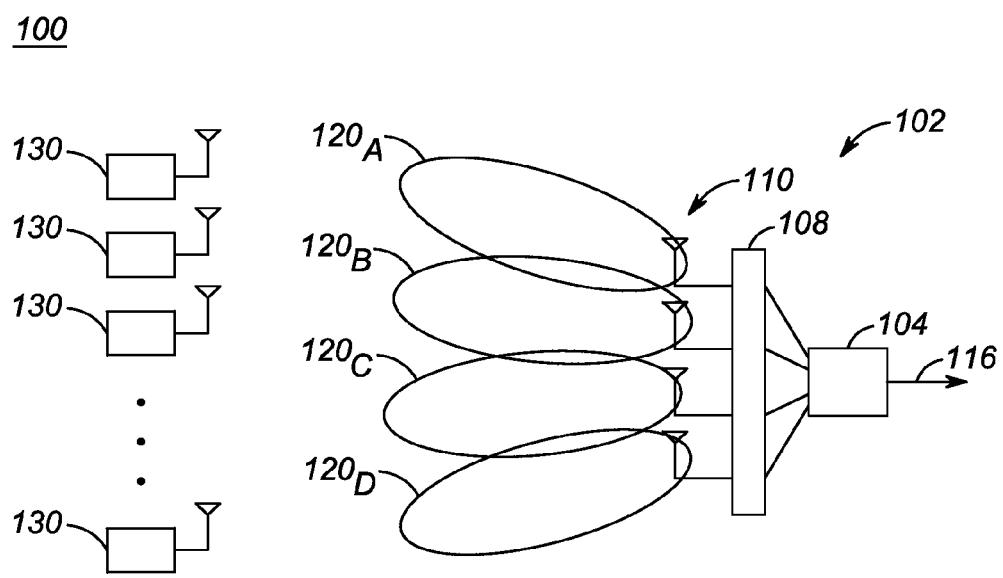
FIG. 1 is a block diagram of a Radio Frequency Identification (RFID) system that includes an RFID reader that employs an adaptive antenna array.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

Accordingly, to address the need for a Radio Frequency Identification (RFID) reader capable of transmitting with high directivity, an antenna array is provided for an RFID reader, which antenna array includes multiple antenna elements circumferentially distributed around a longitudinal axis of the antenna array. Each antenna element includes multiple patch elements disposed above one or more underlying substrates and wherein the multiple patch elements of each antenna element are disposed on an outer side of the antenna element. Further, one or more of the antenna elements is an asymmetric antenna element, wherein a first end of the asymmetric antenna element is wider than a second, opposite end of the asymmetric antenna element, wherein a first patch element disposed proximate to the first end of the asymmetric antenna element is larger than a second patch element disposed proximate to the second end of the asymmetric antenna element, and wherein a resonant frequency associated with the first patch element of the asymmetric antenna element is approximately the same as a resonant frequency associated with the second patch element of the asymmetric antenna element.

Generally, an embodiment of the present invention encompasses an antenna array comprising multiple antenna elements circumferentially distributed around a longitudinal axis of the antenna array. Each antenna element of the multiple antenna elements comprises multiple patch elements disposed above one or more underlying substrates, wherein the multiple patch elements of each antenna element are disposed on an outer side of the antenna element. Further, one or more of the multiple antenna elements is an asymmetric antenna element, wherein a first end of the asymmetric antenna element is wider than a second, opposite end of the asymmetric antenna element, wherein a first patch element disposed proximate to the first end of the asymmetric antenna element is larger than a second patch element disposed proximate to the second end of the asymmetric antenna element, and wherein a resonant frequency associated with the first patch element of the asymmetric antenna element is approximately the same as a resonant frequency associated with the second patch element of the asymmetric antenna element.

Another embodiment of the present invention encompasses a wireless tag reader comprising an at least one transceiver that is configured to transmit and receive wireless signals, an antenna array coupled to the at least one transceiver, and a processor coupled to the at least one transceiver and to the antenna array. The antenna array includes multiple antenna elements circumferentially distributed around a longitudinal axis of the antenna array, wherein each antenna element of the multiple antenna elements comprises multiple patch elements disposed above one or more underlying substrates and wherein the multiple patch elements of each antenna element are disposed on an outer side of the antenna element. Further, one or more of the multiple antenna elements is an asymmetric antenna element, wherein a first end of the asymmetric antenna element is wider than a second, opposite end of the asymmetric antenna element, wherein a first patch element disposed proximate to the first end of the asymmetric antenna element is larger than a second patch element disposed proximate to the second end of the asymmetric antenna element, and wherein a resonant frequency associated with the first patch element of the asymmetric antenna element is approximately the same as a resonant frequency associated with the second patch element of the asymmetric antenna element. The processor is configured to beamform a wireless signal transmitted by the antenna array by controlling an amplitude and phase of a signal applied to each antenna element of the antenna array.

Yet another embodiment of the present invention encompasses an antenna element comprising a substrate and multiple patch elements disposed above the substrate, wherein a first end of the antenna element is wider than a second, opposite end of the antenna element, wherein a first patch element disposed proximate to the first end of the asymmetric antenna element is larger than a second patch element disposed proximate to the second end of the asymmetric antenna element, and wherein a resonant frequency associated with the first patch element of the asymmetric antenna element is approximately the same as a resonant frequency associated with the second patch element of the asymmetric antenna element.

The present invention may be more fully described with reference to FIGS. 1-7. FIG. 1 is a block diagram of a Radio Frequency Identification (RFID) system 100 that includes an RFID reader 102 that employs an adaptive antenna array 110. RFID reader 102 generates an adaptive antenna beam $120_A$-$120_D$ in order to read one or more RFID tags 130 distributed about a monitored area. It will be appreciated that while four antenna beams $120_A$-$120_D$ are illustrated in FIG. 1, any number of antenna beams may be formed. In accordance with various embodiments of the present disclosure, each of the RFID tags 130 may be an active tag, that is, a tag which has a self contained power supply or, as is more usually the case, may be a passive tag that requires external excitation when it is to be read or interrogated within a monitored area of RFID reader 102. In one embodiment of the present invention, RFID reader 102 includes the antenna array 110, one or more transmit/receive (T/R) modules, or transceivers, 108, and a beam forming processor 104. As illustrated in FIG. 1, antenna array 110 of RFID reader 102 has an adaptive (or steerable) antenna beam $120_A$-$120_D$. This allows the transmit power of the transmitter or focus of the receiver to be directed toward a particular area within the monitored area to interrogate one or more RFID tags 130. Again, although FIG. 1 illustrates four distinct antenna beams $120_A$-$120_D$, it will be appreciated that many more antenna beams may be utilized in any particular implementation of the antenna array 110 and beam forming processor 104.

Figure 2:
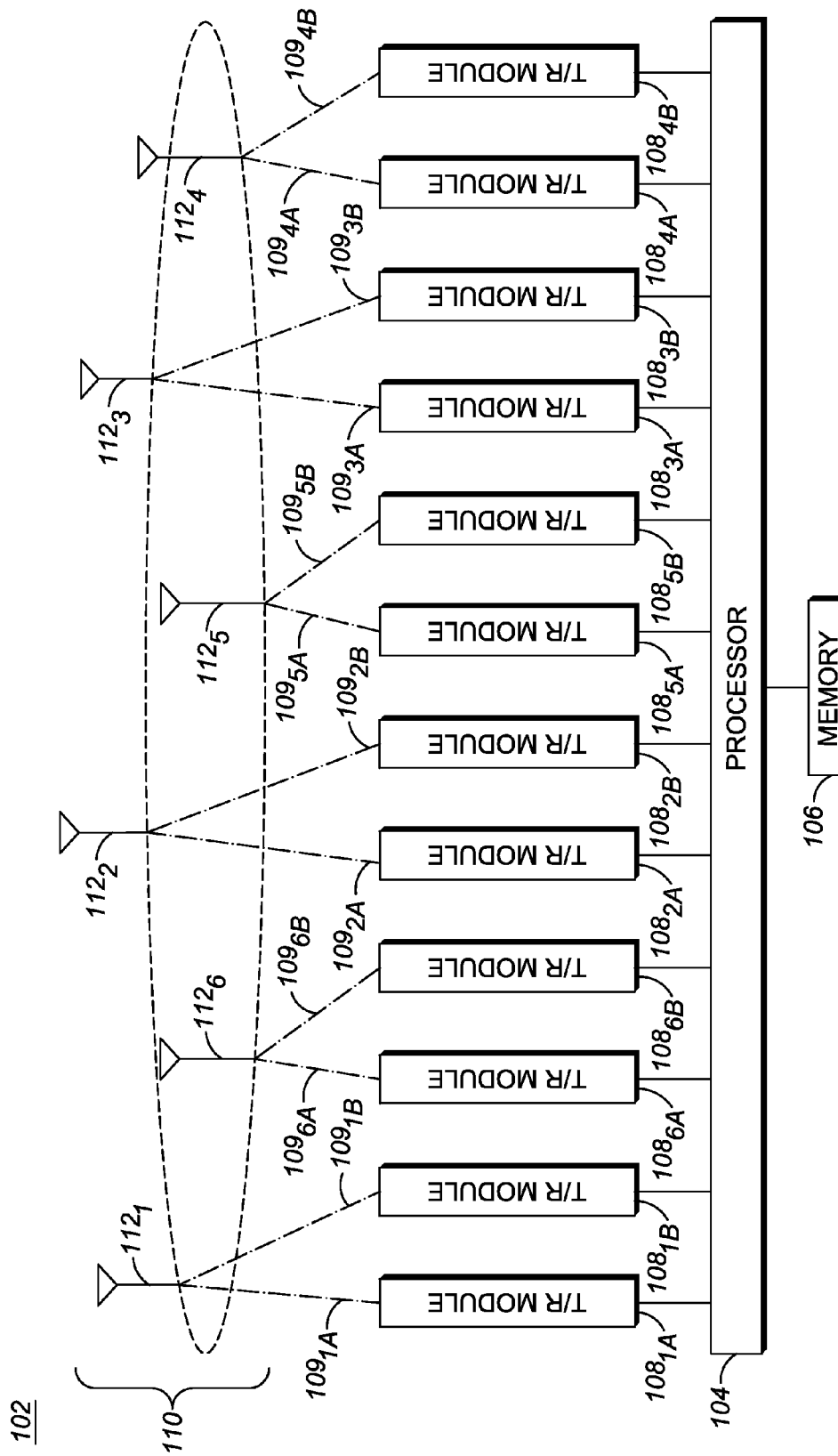
FIG. 2 is a block diagram of the RFID reader of FIG. 1 in accordance with an embodiment of the present invention.

Referring now to FIG. 2, a block diagram is provided that illustrates RFID reader 102 in accordance with an embodiment of the present invention. RFID reader generates or emits a radio-frequency (RF) interrogation signal (also sometimes called a polling signal). An RFID tag 130 responds to the RF interrogation signal by generating an RF response signal that is transmitted back to RFID reader 102 over an RF channel. The RF response signal is modulated in a manner that conveys identification data (that is, a tag identifier (ID)) for the responding RFID tag back to the wireless tag reader. While reader 102 is referred to herein as an RFID reader, one of ordinary skill in the art realizes that reader 102 may be any type of wireless tag reader. For example, in large-scale applications, such as warehouses, retail spaces, and the like, many types of wireless tags may exist in the environment (or "site") and, likewise, multiple types of wireless tag readers, such as RFID readers, an active tag readers, 802.11 tag readers, Zigbee tag readers, etc., may be used is such an environment and may be linked together by a network controller or wireless switches and the like.

RFID reader 102 includes processor 104, such as one or more microprocessors, microcontrollers, digital signal processors (DSPs), combinations thereof or such other devices known to those having ordinary skill in the art. Processor 104 is coupled to an at least one memory device 106, such as random access memory (RAM), dynamic random access memory (DRAM), and/or read only memory (ROM) or equivalents thereof, that maintains data and programs that may be executed by the processor and that allow the communication device to perform all functions necessary to operate in a wireless communication system, including beamforming and operating as an RFID reader, for example, assembling and transmitting an interrogation signal for via a transmit/receive (T/R) module and antenna array 110 and processing of a backscatter signal received from an RFID tag 130 via the T/R module and antenna array 110. RFID reader 102 further includes one or more T/R modules, or transceivers, $108_{1A}$-$108_{6B}$ (twelve shown) that each includes a radio frequency (RF) receiver and an RF transmitter (not shown), that are operationally coupled to processor 104 and to an antenna array 110, and that provide for wirelessly transmitting and receiving signals by the communication device via antenna array 110.

Antenna array 110 includes multiple antenna elements $112_1$-$112_6$ (six shown) that each includes multiple patch elements (not shown). For the purpose of illustrating the principles of the present invention, the antenna elements described herein are depicted as including two patch elements; however, one of ordinary skill in the art realizes that other numbers of patch elements may be included in each antenna element without departing from the spirit and scope of the present invention. Further, while six antenna elements are depicted in FIG. 2, one of ordinary skill in the art realizes that antenna array 110 may comprise any number of antenna elements, as the number of antenna elements is not critical to the present invention. The multiple antenna elements $112_1$-$112_6$ are circumferentially distributed, in a circular or oval fashion, around a longitudinal axis of a conical arrangement of the antenna elements.

Each patch element of each antenna element $112_1$-$112_6$ is coupled to a separate T/R module via a separate feed line assembly. For example, as depicted in FIG. 2, a first patch element of antenna element $112_1$ is coupled to a T/R module $108_{1A}$ by a feed line assembly $109_{1A}$ and a second patch element of antenna element $112_1$ is coupled to a T/R module $108_{1B}$ by a feed line assembly $109_{1B}$. Similarly, a first patch element of antenna element $112_2$ is coupled to a T/R module $108_{2A}$ by a feed line assembly $109_{2A}$ and a second patch element of antenna element $112_2$ is coupled to a T/R module $108_{2B}$ by a feed line assembly $109_{2B}$, a first patch element of antenna element $112_3$ is coupled to a T/R module $108_{3A}$ by a feed line assembly $109_{3A}$ and a second patch element of antenna element $112_3$ is coupled to a T/R module $108_{3B}$ by a feed line assembly $109_{3B}$, a first patch element of antenna element $112_4$ is coupled to a T/R module $108_{4A}$ by a feed line assembly $109_{4A}$ and a second patch element of antenna element $112_4$ is coupled to a T/R module $108_{4B}$ by a feed line assembly $109_{4B}$, a first patch element of antenna element $112_5$ is coupled to a T/R module $108_{5A}$ by a feed line assembly $109_{5A}$ and a second patch element of antenna element $112_5$ is coupled to a T/R module $108_{5B}$ by a feed line assembly $109_{5B}$, and a first patch element of antenna element $112_6$ is coupled to a T/R module $108_{6A}$ by a feed line assembly $109_{6A}$ and a second patch element of antenna element $112_6$ is coupled to a T/R module $108_{6B}$ by a feed line assembly $109_{6B}$. Each feed line assembly $109_{1A}$, $109_{1B}$, $109_{2A}$, $109_{2B}$, $109_{3A}$, $109_{3B}$, $109_{4A}$, $109_{4B}$, $109_{5A}$, $109_{5B}$, $109_{6A}$, $109_{6B}$ (also referred to herein as feed line assemblies $109_{1A}$-$109_{6B}$) includes one or more feed lines for conveying signals from a corresponding T/R module to a corresponding patch element. For example, in one embodiment of the present invention, each feed line assembly $109_{1A}$-$109_{6B}$ may include only a single feed line, while in another, polarization embodiment of the present invention, described below in greater detail, each feed line assembly $109_{1A}$-$109_{6B}$ may include a first feed line coupled to a vertical coupling point of a corresponding patch element and for vertically polarizing the patch element, and may further include a second feed line coupled to a horizontal coupling point of the patch element and for horizontally polarizing the patch element.

In order to optimize a strength of an RF signal received by an RFID tag 130 from RFID reader 102 and to minimize effects of RF fading due to multipath signal propagation, RFID reader 102 employs an antenna array beam steering technique for the broadcast of the RF signal. The beam steering technique allows RFID reader 102 to broadcast a narrowly focused signal to an RFID tag by controlling, by processor 104, an amplitude and phase of a signal applied to each patch element of the antenna elements $112_1$-$112_6$ of the RFID reader's antenna array 110, thereby beamforming a wireless signal transmitted by the antenna array. For example, processor 104 may be coupled to a plurality of complex weighters (not shown) that are interposed between the patch elements of antenna elements $112_1$-$112_6$ and the T/R modules $108_{1A}$-$108_{6B}$, wherein each complex weighter is controlled by processor 104 to apply a phase shift to a signal routed to the patch element by the corresponding T/R module in accordance with well-known beam forming techniques. Further, RFID reader 102, and in particular processor 104, may steer a beam around a geographical area served by the RFID reader by selectively applying, to the antenna elements $112_1$-$112_6$ of antenna array 110, a wireless signal, for example, an interrogation signal, for transmission by the antenna array. For example, processor 104 may first route the signal to antenna elements $112_1$-$112_4$, then route the signal to antenna elements $112_2$-$112_5$, then to antenna elements $112_3$-$112_6$, then to antenna elements $112_1$ and $112_4$-$112_6$, and so on. In other beam steering embodiments, any number of antenna elements may be selectively employed by processor 104 at any given time and the antenna elements selectively employed need not be adjacent to each other.

Figure 3:
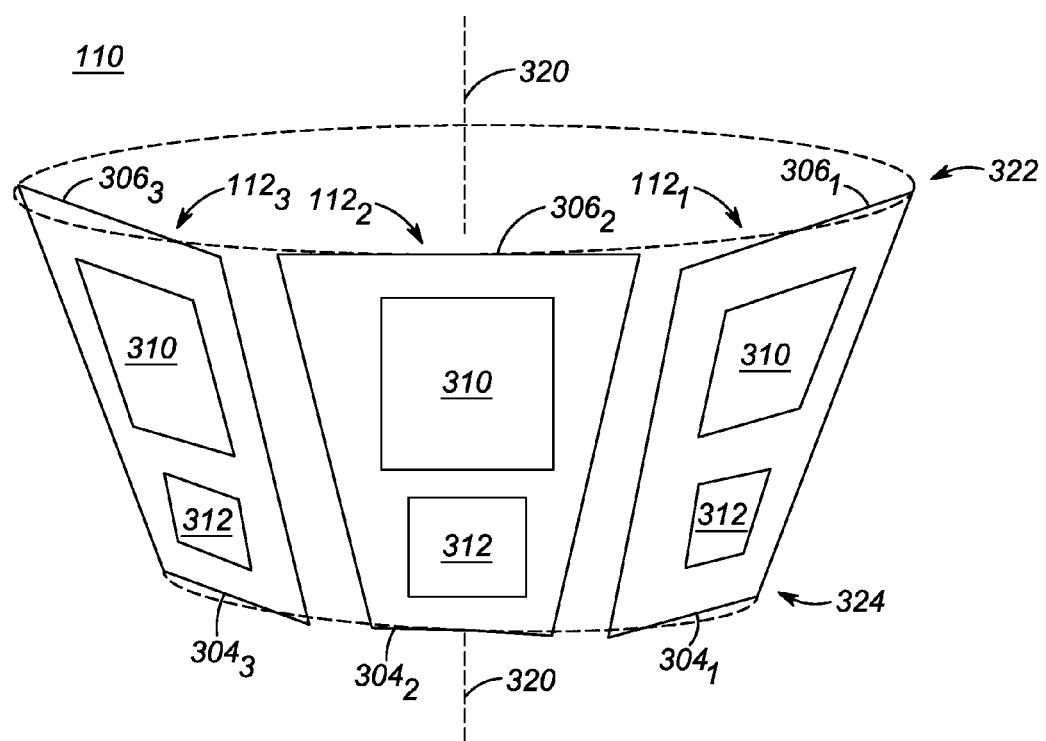
FIG. 3 is an elevated, side view perspective of an exemplary antenna array of the RFID reader of FIG. 1 in accordance with an embodiment of the present invention.

Referring now to FIG. 3, an elevated, side view perspective of antenna array 110 is depicted in accordance with an embodiment of the present invention. Each antenna element $112_1$-$112_6$ of antenna array 110 comprises multiple asymmetric patch elements 310, 312 (two shown with respect to each antenna element) that are affixed to an outer side of the antenna element. The patch elements are asymmetric in the sense that they are of different sizes, that is, the patch elements 310 of a larger (or higher, as depicted in FIG. 3) circumferential row around the antenna array, are larger than the patch elements 312 of a smaller (or lower, as depicted in FIG. 3) circumferential row around the antenna array. Preferably, the spacing of the antenna elements $112_1$-$112_6$ of antenna array 110 is such that a circumferential spacing between the phase centers of patch elements 310, 312 of adjacent antenna elements $112_1$-$112_6$ and of a same circumferential row, for example, patch elements 312, is approximately constant. Each patch element 310, 312 outwardly radiates (away from the conical arrangement) signals applied to the patch element via the feed line assembly $109_{1A}$-$109_{6B}$ serving the patch element.

As noted above, the multiple antenna elements $112_1$-$112_6$ are spaced apart from each other in a circular or oval arrangement. Further, the multiple antenna elements $112_1$-$112_6$ are situated in a conical arrangement, that is, the multiple antenna elements $112_1$-$112_6$ are circumferentially distributed around a longitudinal axis 320 of the conical arrangement such that each antenna element has an outward incline away from the longitudinal axis, that is, a base $304_1$-$304_6$ of each antenna element $112_1$-$112_6$ (only antenna elements $112_1$-$112_3$ and corresponding bases $304_1$-$304_3$ are depicted in FIG. 3), situated proximate to a base 324 of the conical arrangement, is closer to longitudinal axis 320 than a top end $306_1$-$306_6$ of the antenna element (again, only antenna elements $112_1$-$112_3$ and corresponding top ends $306_1$-$306_3$ are depicted in FIG. 3), which is situated proximate to a top end 322 of the conical arrangement. However, while FIG. 3 depicts the conical arrangement of antenna array 110 opening upwards, this is merely for ease of description and one of ordinary skill in the art realizes that the conical arrangement of antenna array 110 may have any orientation, for example, may open downwards, such that base 324 of antenna array 110 is above end 322 of the antenna array.

Further, each of the multiple antenna elements $112_1$-$112_6$ is asymmetric, that is, a top end $306_1$-$306_6$ of the antenna element is wider than a base $304_1$-$304_6$ of the antenna element, and a patch element 310 proximate to the top end of the antenna element is larger than a patch element 312 proximate to the base of the antenna element. However, in another embodiment of the present invention, one or more, but fewer than all, of the multiple antenna elements $112_1$-$112_6$ may be a symmetric antenna element, as described in greater detail below. As antenna array 110 comprises one or more asymmetric antenna elements $112_1$-$112_6$, antenna array 110 may be referred to as an 'asymmetric' antenna array.

Figure 4:
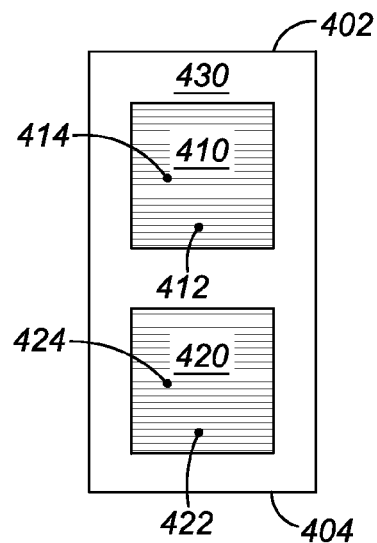
FIG. 4 is a side view of an exemplary symmetric antenna element in accordance with an embodiment of the present invention.

For example, and referring now to FIG. 4, a top of a symmetric antenna element 400 is depicted in accordance with an embodiment of the present invention. Symmetric antenna element 400 comprises multiple patch elements 410, 420 that are each affixed to an underlying substrate 430. Substrate 430 preferably is an insulation covered conductive ground plane and patch elements 410, 420, for example, microstrip patches or copper plates (the latter mechanically affixed to substrate 430 by, for example, a screw) that are each electrically coupled to one or more feed lines, such as feed lines included in feed line assemblies $109_{1A}$-$109_{6B}$, from a corresponding T/R module, such as T/R modules $108_{1A}$-$108_{6B}$.

Each patch element 410, 420 is coupled to a first feed line at a vertical coupling point 412, 422 that is vertically offset from the center of the patch element and to a second feed line at a horizontal coupling point 414, 424 that is horizontally offset from the center of the patch element. Thus, the patch element 410, 420 may be vertically polarized by feeding a signal to the patch element via the feed line corresponding vertical coupling point 412, 422, and may be horizontally polarized by feeding a signal to the patch element 410, 420 via the feed line corresponding to the horizontal coupling point 414, 424. For example, the feed lines associated with the vertical and horizontal coupling points of a patch element, such as coupling points 412 and 414 of patch element 410, may be coupled to a radio frequency (RF) switch coupled to and controlled by processor 104, which switch routes a signal intended for the patch element so that the signal is transmitted over either feed line. Thus antenna array 110 may be operated as a polarized array by polarizing the symmetric antenna elements appropriately. Further, each patch element 410, 420 may be circularly polarized by feeding a signal to both feeds of the patch element via the corresponding vertical coupling point 412, 422 and a phase shifted signal to the corresponding horizontal coupling point 414, 424.

As this is a symmetric antenna element, a top end 402 of antenna element 400 is approximately a same width as a base 404 of the antenna element, and the multiple patch elements 410, 420 (two shown) of the antenna element are approximately a same size (with respect to width and length).

Figure 5:
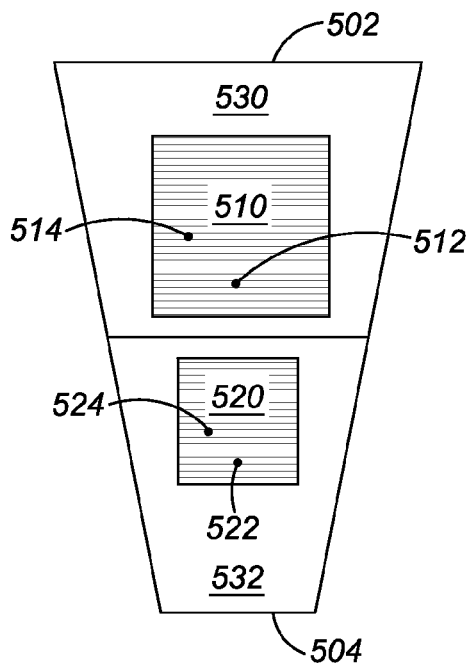
FIG. 5 is a side view of an exemplary asymmetric antenna element of the antenna array of FIG. 1 in accordance with an embodiment of the present invention.

In contrast to symmetric antenna element 400, FIG. 5 depicts an exemplary top view of an asymmetric antenna element 500 in accordance with an embodiment of the present invention. Antenna element 500 comprises multiple patch elements 510, 520 that are each disposed above, and affixed, to a corresponding underlying substrate 530, 532 (which may be the same substrate). Substrates 530, 532 preferably are insulation covered conductive ground planes and patch elements 510, 520 are conductive metallic, for example, copper, patches, for example, microstrip patches or copper plates (the latter mechanically affixed to a corresponding substrate 530, 532 by, for example, a screw), that each are electrically coupled to a feed line, such as feed lines of feed lines assemblies $109_{1A}$-$109_{6B}$, from a corresponding T/R module, such as T/R modules $108_{1A}$-$108_{6B}$. As noted above, each patch element of an antenna element has its own feed line connecting the patch element to the corresponding T/R module.

For example, similar to symmetric antenna element 400, each patch element 510, 520 is coupled to a first feed line at a vertical coupling point 512, 522 that is vertically offset from the center of the patch element and to a second feed line at a horizontal coupling point 514, 524 that is horizontally offset from the center of the patch element. Thus, the patch element 510, 520 may be vertically polarized by feeding a signal to the patch element via the feed line corresponding vertical coupling point 512, 522, and may be horizontally polarized by feeding a signal to the patch element 510, 520 via the feed line corresponding to the horizontal coupling point 514, 524. For example, the feed lines associated with the vertical and horizontal coupling points of a patch element, such as coupling points 512 and 514 of patch element 510, may be coupled to a radio frequency (RF) switch coupled to and controlled by processor 104, which switch routes a signal intended for the patch element so that the signal is transmitted over either feed line. Thus antenna array 110 may be operated as a polarized array by polarizing the symmetric antenna elements appropriately. Further, each patch element 510, 520 may be circularly polarized by feeding a signal to both feeds of the patch element via the corresponding vertical coupling point 512, 522 and a phase shifted signal to the corresponding horizontal coupling point 514, 524.

A first, top end 502 of antenna element 500 is wider than a second, opposite end, or base, 504 of the antenna element, and correspondingly the multiple patch elements 510, 520 of antenna element 500 are of different sizes (with respect to width and length). For example, as antenna element 500 is wider at its top end 502 than at its base 504, a first patch element 510 of the multiple patch elements 510, 520 that is disposed proximate to the first, or top, end 502 of antenna element 500 is larger, for example, wider and/or longer, than a second patch element 520 that is disposed proximate to the second end, or base, 504 of antenna element 500.

While not depicted in FIG. 5, an intervening layer is interposed between each patch element 510, 520 and corresponding substrates 530 and 532. The intervening layer under patch element 510 is composed of a different material having a different dielectric property than the intervening layer under patch element 520. As is known in the art, the directivity of a patch element is a function of the area of the patch element and the resonant frequency of the patch element is a function of both the area and the dielectric properties of the patch element and the intervening layer. By employing asymmetric antenna elements 500 comprising patch elements 510, 520 of different sizes, each associated with an intervening layer having a different dielectric property, asymmetric antenna array 110 is able to better control a resonant frequency of the patch elements and increase the effective area of the antenna array, thereby providing improved overall directivity than symmetric circular antenna arrays of the prior art consisting exclusively of symmetric antenna elements.

That is, as a resonant frequency associated with a material is inversely related to both dielectric constant and area, by using a material for the intervening layer associated with patch element 510 that has a lower dielectric constant than the material used for the intervening layer associated with patch element 520, the resonating frequencies of patch elements 510 and 520 may be approximately equalized, that is, so that the resonating frequencies of patch elements 510 and 520 are approximately the same. Further, a larger patch element, such as patch element 510, typically has better directivity than a smaller patch element, such as patch element 520, due to increased area. However, by using a different dielectric material for each of the intervening layers, a resonant frequency of each patch element 510, 520 also may be controlled.

In other embodiments of the present invention, the intervening layers under each of patch elements 510 and 520 may have approximately a same dielectric property and circuitry may be used to adjust the resonant frequency of each patch element 510, 520 such that each patch element has approximately a same resonant frequency. For example, a different impedance matching circuit using inductors and capacitors may be coupled to each of patch elements 510 and 520 and the underlying substrate or interposed between the associated feed lines and the patch element such that a resonant frequency of each patch element is approximately the same.

Figure 6:
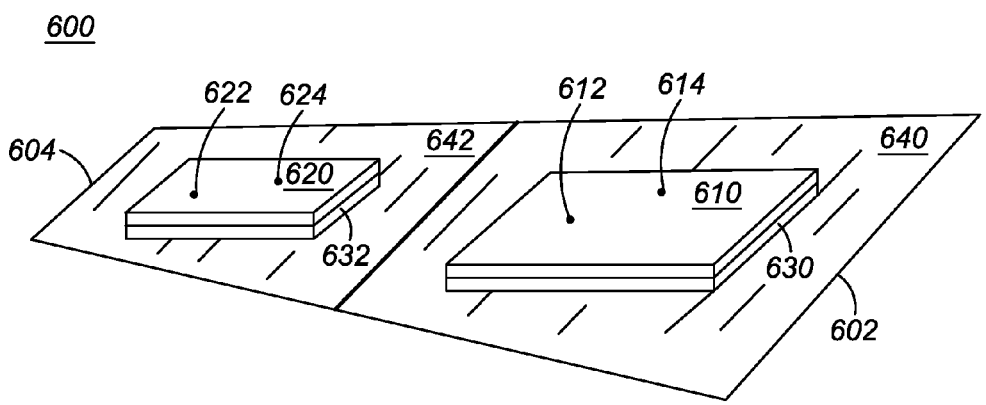
FIG. 6 is an elevated, side view perspective of an exemplary asymmetric antenna element of the antenna array of FIG. 1 in accordance with another embodiment of the present invention.

FIG. 6 depicts an exemplary side view of an asymmetric antenna element 600 in accordance with an embodiment of the present invention. Antenna element 600 comprises multiple patch elements 610, 620 that are each disposed above and affixed to a corresponding underlying substrate 640, 642 (which may be the same substrate). Substrates 640, 642 preferably are conductive ground planes and patch elements 610, 620 are conductive metallic, for example, copper, patches, for example, copper plates, that each are electrically coupled to a feed line, such as feed lines of feed line assemblies $109_{1A}$-$109_{6B}$, from a corresponding T/R module, such as T/R modules $108_{1A}$-$108_{6B}$. A first, or top, end 602 of antenna element 600 is wider than a second, opposite end, or base, 604 of the antenna element, and the multiple patch elements 610, 620 of antenna element 600 correspondingly are of different sizes (with respect to width and length). For example, as antenna element 600 is wider at the first, or top, end 602 than at the second, or base, end 604, a first patch element 610 of the multiple patch elements 610, 620 that is disposed proximate to the top end 602 of antenna element 600 is larger, for example, wider and/or longer, than a second patch element 620 that is disposed proximate to the base 604 of antenna element 600.

Interposed between each patch element 610, 620 and the corresponding substrate 640, 642 is an intervening layer 630, 632. That is, a first intervening layer 630 is interposed between first patch element 610 and substrate 640, and a second intervening layer 632 is interposed between second patch element 612 and substrate 642. In asymmetric antenna element 600, each patch element 610, 620 has an approximately same resonant frequency at least in part due to use of a different intervening layer for, and a corresponding different dielectric property of, each intervening layer 630, 632.

In one embodiment of the present invention, each intervening layer 630, 632 may be a material having a different dielectric property than the material used for the other intervening layer. In another embodiment of the present invention, the larger intervening layer 630 may be an air gap, wherein patch element 610 is offset from the underlying substrate by use of non-conductive stand-offs and wherein a height of the patch element above the corresponding underlying substrate 640, 642, may be adjusted, for example, by use of stand-offs of different sizes. By using a material or air gap for intervening layer 630 that has a lower dielectric constant than the material used for intervening layer 632, the resonating frequencies of patch elements 610 and 620 may be approximately equalized.

Further, similar to asymmetric antenna element 500, each patch element 610, 620 is coupled to a first feed line at a vertical coupling point 612, 622 that is vertically offset from the center of the patch element and to a second feed line at a horizontal coupling point 614, 624 that is horizontally offset from the center of the patch element. Thus, the patch elements 610, 620 may be vertically polarized by feeding a signal to the patch element via the feed line corresponding vertical coupling point 612, 622, and may be horizontally polarized by feeding a signal to the patch element 610, 620 via the feed line corresponding to the horizontal coupling point 614, 624. For example, the feed lines associated with the vertical and horizontal coupling points of a patch element, such as coupling points 612 and 614 of patch element 610, may be coupled to a radio frequency (RF) switch coupled to and controlled by processor 104, which switch routes a signal intended for the patch element so that the signal is transmitted over either feed line. Thus antenna array 110 may be operated as a polarized array by polarizing the symmetric antenna elements appropriately. Further, each patch element 610, 620 may be circularly polarized by feeding a signal to both feeds of the patch element via the corresponding vertical coupling point 612, 622 and a phase shifted signal to the corresponding horizontal coupling point 614, 624.

Figure 7:
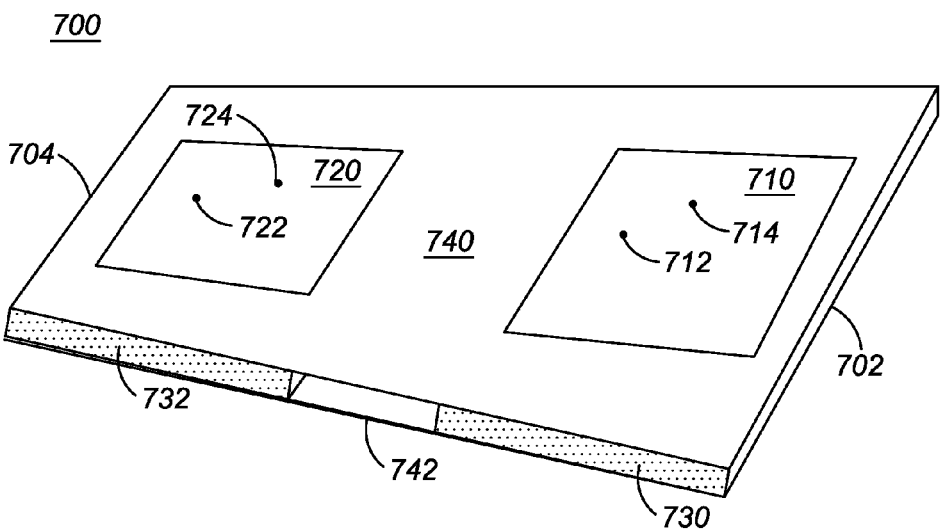
FIG. 7 is an elevated, side view perspective of an exemplary asymmetric antenna element of the antenna array of FIG. 1 in accordance with another embodiment of the present invention.

Referring now to FIG. 7, an exemplary asymmetric antenna element 700 is depicted in accordance with yet another embodiment of the present invention. Antenna element 700 comprises multiple patch elements 710, 720 that are each disposed above and affixed to a first underlying substrate 740. Antenna element 700 further comprises a second underlying substrate 742 similar in size and shape to the first substrate 740 and that is underlying the first substrate, and an intervening layer 730, 732 that is sandwiched between the first substrate 740 and the second substrate 742.

Substrates 740 and 742 preferably are FR4 boards. Further, substrate 742 preferably is an insulation covered conductive ground plane. Also, patch elements 710, 720 are conductive metallic, for example, copper, patches, for example, copper plates, that each are electrically coupled to a feed line, such as feed lines of feed line assemblies $109_{1A}$-$109_{6B}$, from a corresponding T/R module, such as T/R modules $108_{1A}$-$108_{6B}$.

Intervening layer 730, 732 comprises a first dielectric block 730 that underlies a first patch element 710 of the multiple patch elements 710, 720 and a second dielectric block 732 that underlies a second patch element 720 of the multiple patch elements 710, 720. Each dielectric block 730, 732 may be a material having a different dielectric property than the material used for the other dielectric block. By using a material for dielectric block 730, which could be an air gap, that has a lower dielectric constant than the material used for dielectric block 732, the resonating frequencies of patch elements 710 and 720 may be approximately equalized despite their size difference.

A first, or top, end 702 of antenna element 70 is wider than a second, opposite end, or base, 704 of the antenna element, and the multiple patch elements 710, 720 of antenna element 700 correspondingly are of different sizes (with respect to width and length). For example, as antenna element 700 is wider at the first, or top, end 702 than at the second, or base, end 704, the first patch element 710 of the multiple patch elements 710, 720 that is disposed proximate to the top end 702 of antenna element 700 is larger, for example, wider and/or longer, than a second patch element 720 that is disposed proximate to the base 704 of antenna element 700. The same may or may not hold true for the dielectric blocks 730, 732 underlying the patch elements 710, 720.

Further, similar to asymmetric antenna elements 500 and 600, each patch element 710, 720 is coupled to a first feed line at a vertical coupling point 712, 722 that is vertically offset from the center of the patch element and to a second feed line at a horizontal coupling point 714, 724 that is horizontally offset from the center of the patch element. Thus, the patch elements 710, 720 may be vertically polarized by feeding a signal to the patch element via the feed line corresponding vertical coupling point 712, 722, and may be horizontally polarized by feeding a signal to the patch element 710, 720 via the feed line corresponding to the horizontal coupling point 714, 724. For example, the feed lines associated with the vertical and horizontal coupling points of a patch element, such as coupling points 712 and 714 of patch element 710, may be coupled to a radio frequency (RF) switch coupled to and controlled by processor 104, which switch routes a signal intended for the patch element so that the signal is transmitted over either feed line. Thus antenna array 110 may be operated as a polarized array by polarizing the symmetric antenna elements appropriately. Further, each patch element 710, 720 may be circularly polarized by feeding a signal to both feeds of the patch element via the corresponding vertical coupling point 712, 422 and a phase shifted signal to the corresponding horizontal coupling point 714, 724.

While antenna elements 600 and 700 are depicted as asymmetric antenna elements, symmetric antenna element 400 may be similarly constructed, wherein patch elements 610 and 620, or 710 and 720, of the antenna element 600, 700 would be of a same size and wherein the top end 602, 702 of the antenna element 600, 700 would be of a same width as the base 604, 704 of the antenna element.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An antenna array comprising:
  a plurality of antenna elements circumferentially distributed around a longitudinal axis of the antenna array;
  wherein each antenna element of the plurality of antenna elements comprises a plurality of patch elements disposed above one or more underlying substrates and wherein the plurality of patch elements of each antenna element are disposed on an outer side of the antenna element; and
  wherein one or more of the plurality of antenna elements is an asymmetric antenna element, wherein a first end of the asymmetric antenna element is wider than a second, opposite end of the asymmetric antenna element, wherein a first patch element disposed proximate to the first end of the asymmetric antenna element is larger than a second patch element disposed proximate to the second end of the asymmetric antenna element, and wherein a resonant frequency associated with the first patch element of the asymmetric antenna element is approximately the same as a resonant frequency associated with the second patch element of the asymmetric antenna element.

2. The antenna array of claim 1, wherein for each asymmetric antenna element, a first intervening layer is interposed between the first patch element and the one or more underlying substrates, a second intervening layer is interposed between the second patch element and the one or more underlying substrates, and a dielectric constant of the first intervening layer is different than a dielectric constant of the second intervening layer.

3. The antenna array of claim 2, wherein each of the first intervening layer and the second intervening layer is a different dielectric material.

4. The antenna array of claim 3, wherein the first intervening layer is an air gap.

5. The antenna array of claim 1, wherein the plurality of antenna elements are circumferentially distributed around the longitudinal axis of the antenna array in one of a circular fashion or an oval fashion.

6. The antenna array of claim 5, wherein the plurality of antenna elements are situated in a conical arrangement around the longitudinal axis of the antenna array such that each antenna element has an outward incline away from the longitudinal axis.

7. The antenna array of claim 1, wherein each antenna element of the plurality of antenna elements is coupled to a same wireless tag reader.

8. The antenna array of claim 1, wherein one or more antenna elements of the plurality of antenna elements is configured so that it may be one of horizontally polarized, vertically polarized, or circularly polarized.

9. A wireless tag reader comprising:
- an at least one transceiver that is configured to transmit and receive wireless signals;
- an antenna array coupled to the at least one transceiver and comprising:
  - a plurality of antenna elements circumferentially distributed around a longitudinal axis of the antenna array;
  - wherein each antenna element of the plurality of antenna elements comprises a plurality of patch elements disposed above one or more underlying substrates and wherein the plurality of patch elements of each antenna element are disposed on an outer side of the antenna element;
  - wherein one or more of the plurality of antenna elements is an asymmetric antenna element, wherein a first end of the asymmetric antenna element is wider than a second, opposite end of the asymmetric antenna element, wherein a first patch element disposed proximate to the first end of the asymmetric antenna element is larger than a second patch element disposed proximate to the second end of the asymmetric antenna element, and wherein a resonant frequency associated with the first patch element of the asymmetric antenna element is approximately the same as a resonant frequency associated with the second patch element of the asymmetric antenna element; and
- a processor coupled to the at least one transceiver and to the antenna array and that is configured to beamform a wireless signal transmitted by the antenna array by controlling a phase of a signal applied to each antenna element of the antenna array.

10. The wireless tag reader of claim 9, wherein for each asymmetric antenna element, a first intervening layer is interposed between the first patch element and the one or more underlying substrates, a second intervening layer is interposed between the second patch element and the one or more underlying substrates, and a dielectric constant of the first intervening layer is different than a dielectric constant of the second intervening layer.

11. The wireless tag reader of claim 10, wherein each of the first intervening layer and the second intervening layer is a different dielectric material.

12. The wireless tag reader of claim 10, wherein the first intervening layer is an air gap.

13. The wireless tag reader of claim 9, wherein the plurality of antenna elements are circumferentially distributed around the longitudinal axis of the antenna array in one of a circular fashion or an oval fashion.

14. The wireless tag reader of claim 13, wherein the plurality of antenna elements are situated in a conical arrangement around the longitudinal axis of the antenna array such that each antenna element has an outward incline away from the longitudinal axis.

15. The wireless tag reader of claim 9, wherein each antenna element of the plurality of antenna elements is coupled to the at least one transceiver via a separate feed line.

16. The wireless tag reader of claim 15, wherein each patch element is coupled to the at least one transceiver via a separate feed line.

17. The wireless tag reader of claim 9, wherein one or more antenna elements of the plurality of antenna elements is configured so that it may be one of horizontally polarized, vertically polarized, or circularly polarized.

18. The wireless tag reader of claim 9, wherein the processor is configured to rotate a beam by selectively routing, to at least one antenna element of the plurality of antenna elements but fewer than all antenna elements of the plurality of antenna elements, a signal for transmission by the antenna array.

19. An asymmetric antenna element of comprising:
- a substrate;
- a plurality of patch elements disposed above the substrate; and
- wherein a first end of the antenna element is wider than a second, opposite end of the antenna element, wherein a first patch element disposed proximate to the first end of the asymmetric antenna element is larger than a second patch element disposed proximate to the second end of the asymmetric antenna element, and wherein a resonant frequency associated with the first patch element of the asymmetric antenna element is approximately the same as a resonant frequency associated with the second patch element of the asymmetric antenna element;
- a first intervening layer interposed between the first patch element and the substrates;
- a second intervening layer is interposed between the second patch element and the one or more underlying substrates; and
- wherein a dielectric constant of the first intervening layer is different than a dielectric constant of the second intervening layer.

20. The antenna element of claim 19, wherein one of the first intervening layer and the second intervening layer is an air gap.

21. An asymmetric antenna element of comprising:
- a substrate;
- a plurality of patch elements disposed above the substrate; and
- wherein a first end of the antenna element is wider than a second, opposite end of the antenna element, wherein a first patch element disposed proximate to the first end of the asymmetric antenna element is larger than a second patch element disposed proximate to the second end of the asymmetric antenna element, and wherein a resonant frequency associated with the first patch element of the asymmetric antenna element is approximately the same as a resonant frequency associated with the second patch element of the asymmetric antenna element; wherein at least one of the plurality of patch elements is coupled to an impedance matching circuit comprising one or more using inductors and one or more capacitors and wherein an impedance of matching circuit coupled to the first patch element is different from an impedance of a matching circuit coupled to the second patch element.

* * * * *